(12) United States Patent
Ruskin

(10) Patent No.: US 12,443,976 B1
(45) Date of Patent: Oct. 14, 2025

(54) DISTANCE BASED CONNECTED CAR DEVICE DIGITAL PROMOTION GENERATION SYSTEM AND RELATED METHODS

(71) Applicant: Inmar Clearing, Inc., Winston-Salem, NC (US)

(72) Inventor: Grazia Ruskin, Austin, TX (US)

(73) Assignee: INMAR CLEARING, INC., Winston-Salem, NC (US)

( * ) Notice: Subject to any disclaimer, the term of this patent is extended or adjusted under 35 U.S.C. 154(b) by 146 days.

(21) Appl. No.: 18/371,386

(22) Filed: Sep. 21, 2023

(51) Int. Cl.
 *G06Q 30/00* (2023.01)
 *G06Q 30/0251* (2023.01)

(52) U.S. Cl.
 CPC .............................. *G06Q 30/0266* (2013.01)

(58) Field of Classification Search
 None
 See application file for complete search history.

(56) References Cited

U.S. PATENT DOCUMENTS

| | | | |
|---|---|---|---|
| 10,530,877 B2 | 1/2020 | Maccini et al. | |
| 2008/0288406 A1* | 11/2008 | Seguin | G06Q 30/0205 705/50 |
| 2011/0270673 A1* | 11/2011 | Lin | G06Q 30/0246 707/E17.014 |
| 2013/0252635 A1* | 9/2013 | Zheng | H04L 67/52 455/456.2 |
| 2014/0129339 A1* | 5/2014 | MacNeille | G06Q 30/0207 705/14.62 |
| 2018/0109916 A1* | 4/2018 | Sprogis | G06Q 20/3224 |
| 2018/0158329 A1* | 6/2018 | Benhammou | G08G 1/07 |

* cited by examiner

*Primary Examiner* — Christopher Stroud
(74) *Attorney, Agent, or Firm* — ALLEN, DYER, DOPPELT + GILCHRIST, P.A.

(57) ABSTRACT

A promotion processing system for a vehicle may include a connected car device configured to be positioned in the vehicle, obtain a geographic vehicle position, and permit control of at least one application on a mobile wireless communications device. The promotion processing system may also include a promotion processing server configured to communicate with the connected car device to determine the geographic vehicle position and determine that the vehicle is within a threshold distance from a retailer based upon the geographic vehicle position. The promotion processing server may be configured to, upon the vehicle being within the threshold distance from the retailer, determine that the vehicle has stopped motion, and upon the vehicle stopping motion, generate a digital promotion redeemable at the retailer, and communicate the digital promotion to the connected car device.

16 Claims, 8 Drawing Sheets

DISTANCE BASED CONNECTED CAR DEVICE DIGITAL PROMOTION GENERATION SYSTEM AND RELATED METHODS

TECHNICAL FIELD

The present application relates to vehicular electronics, and, more particularly, to in-vehicle communications systems, and related methods.

BACKGROUND

A vehicle that can receive and transmit data communications outside of the vehicle may be considered a connected car or as having a connected car device. A connected car, for example, may permit sharing of network access and vehicular data with another device, for example, both inside and outside the vehicle. One type of connected car system permits a mobile wireless communications device to operate based upon communications with the connected car system. For example, the mobile wireless communications device may be controlled or operated via the connected car device.

Sales of a particular product or service may be based upon how well that product or service is marketed to a consumer. One form of marketing is a coupon, typically in paper form, for a discount toward the product or service. Some coupons may be retailer-specific, for example, only redeemable for the discount at a particular retailer, while other coupons may be product-specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon the quantity of a given item, for example, brand of item, size of the product in terms of packaging, and/or the price point of the given item. A typical coupon may also be redeemable only at a given retailer and/or within a threshold time.

SUMMARY

A promotion processing system for a vehicle may include a connected car device configured to be positioned in the vehicle, obtain a geographic vehicle position, and permit control of at least one application on a mobile wireless communications device. The promotion processing system may also include a promotion processing server configured to communicate with the connected car device to determine the geographic vehicle position and determine that the vehicle is within a threshold distance from a retailer based upon the geographic vehicle position. The promotion processing server may be configured to, upon the vehicle being within the threshold distance from the retailer, determine that the vehicle has stopped motion, and upon the vehicle stopping motion, generate a digital promotion redeemable at the retailer, and communicate the digital promotion to the connected car device.

The promotion processing server may be configured to determine that the vehicle has stopped motion based upon operation of a transmission of the vehicle to a park position, for example. The connected car device may include a geographic position determining device configured to obtain the geographic position. The promotion processing server may be configured to determine that the vehicle has stopped based upon the geographic position determining device, for example. The promotion processing server may be configured to communicate the digital promotion to the connected car device based upon a transmission of the vehicle being in a park position, for example.

The connected car device may include connected car wireless communications circuitry. The promotion processing server may be configured to communicate the digital promotion to the connected car device for display thereat via the connected car wireless communications circuitry, for example.

The promotion processing server may be configured to communicate the digital promotion to the connected car device for display thereat via the mobile wireless communications device. The connected car device may include a head unit and a display coupled to the head unit, for example.

The mobile wireless communications device may have a device identifier associated therewith. The promotions processing server may be configured to obtain the device identifier from the mobile wireless communications device and generate the digital promotion based upon the device identifier, for example.

A user may have a user identifier associated therewith. The promotion processing server may be configured to obtain the user identifier and generate the digital promotion based upon the user identifier, for example.

The connected car device may include a touch-display. The promotion processing server may be configured to save the digital promotion to a digital wallet associated with a user based upon input to the touch-display, for example.

A method aspect is directed to a method of processing a promotion. The method may include using a promotion processing server to communicate with a connected car device to determine a geographic vehicle position. The connected car device may be configured to be positioned in the vehicle, obtain the geographic vehicle position, and permit control of at least one application on a mobile wireless communications device.

The method may also include using the promotion processing server to determine that the vehicle is within a threshold distance from a retailer based upon the geographic vehicle position, and upon the vehicle being within the threshold distance from the retailer, determine that the vehicle has stopped motion. The method may further include using the promotion processing server to, upon the vehicle stopping motion, generate a digital promotion redeemable at the retailer, and communicate the digital promotion to the connected car device.

A computer readable medium aspect is directed to a non-transitory computer readable medium for processing a promotion, the non-transitory computer readable medium includes computer executable instructions that when executed by a processor cause the processor to perform operations. The operations may include communicating with a connected car device to determine a geographic vehicle position. The connected car device may be configured to be positioned in the vehicle, obtain the geographic vehicle position, and permit control of at least one application on a mobile wireless communications device.

The operations may also include determining that the vehicle is within a threshold distance from a retailer based upon the geographic vehicle position, and upon the vehicle being within the threshold distance from the retailer, determining that the vehicle has stopped motion, and upon the vehicle stopping motion, generating a digital promotion redeemable at the retailer, and communicating the digital promotion to the connected car device.

DETAILED DESCRIPTION

Figure 1:
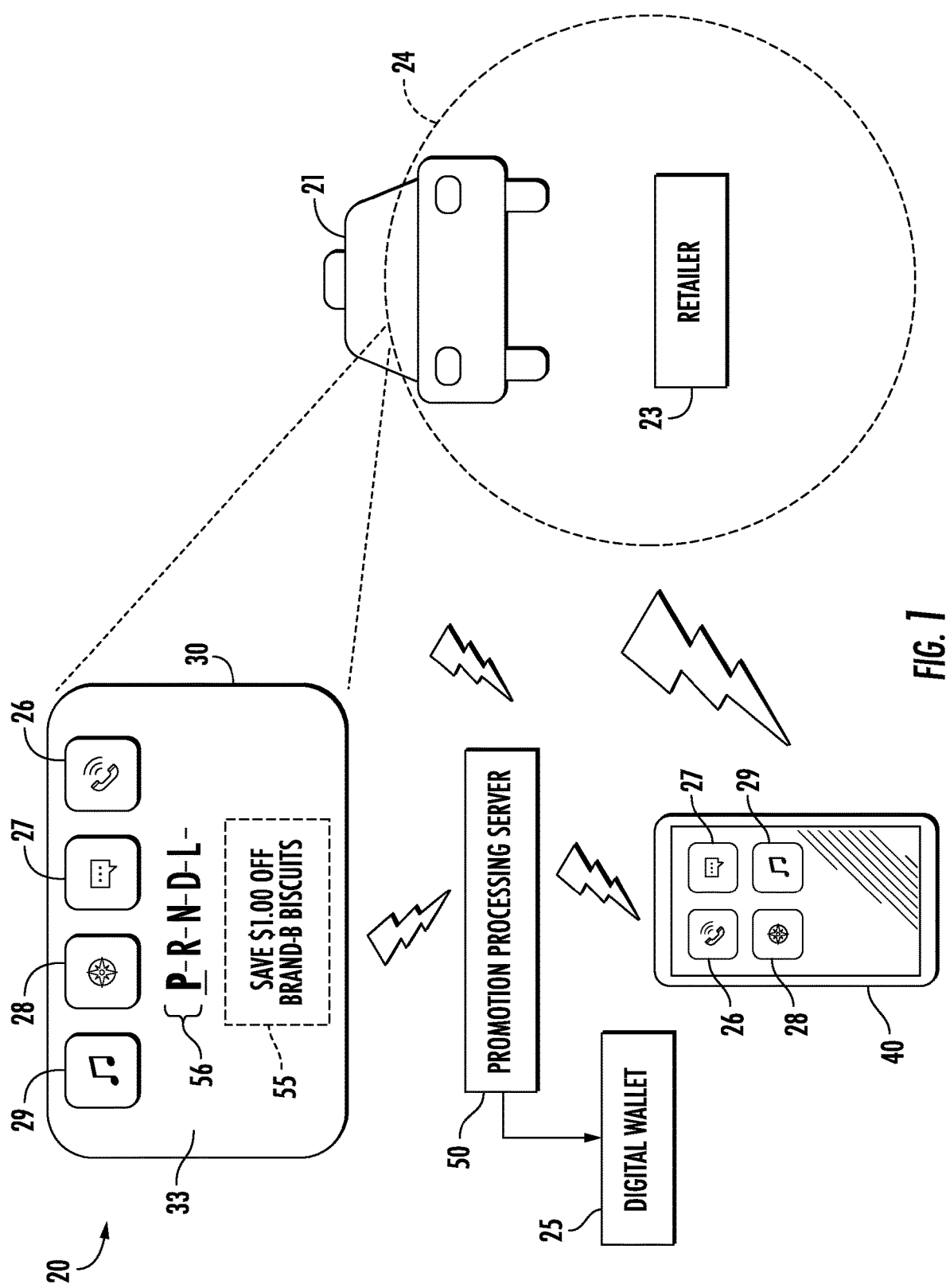
FIG. 1 is a schematic diagram of a promotion processing system in accordance with an embodiment.
Figure 2:
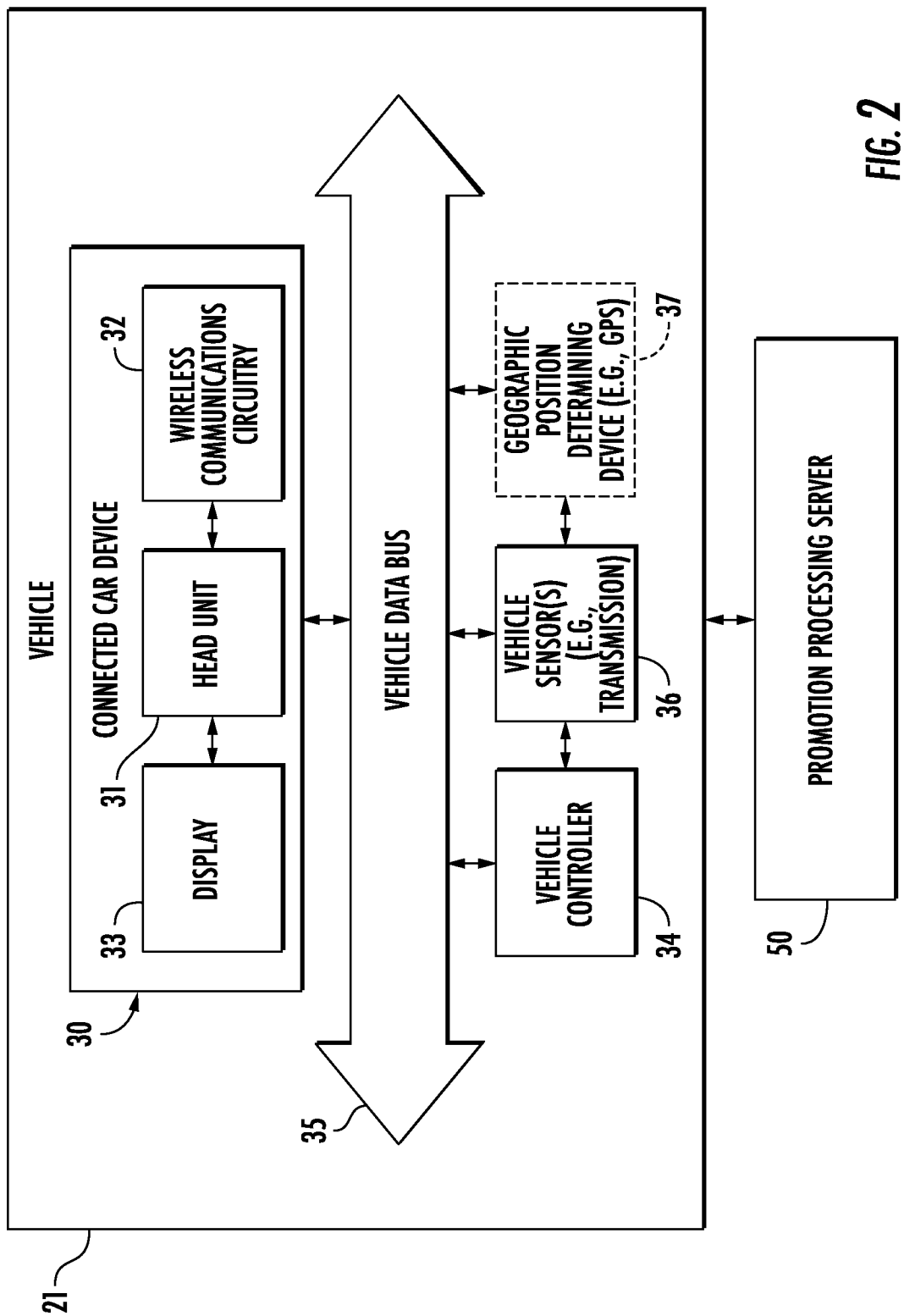
FIG. 2 is a schematic block diagram of a portion of the promotion processing system of FIG. 1.
Figure 3:
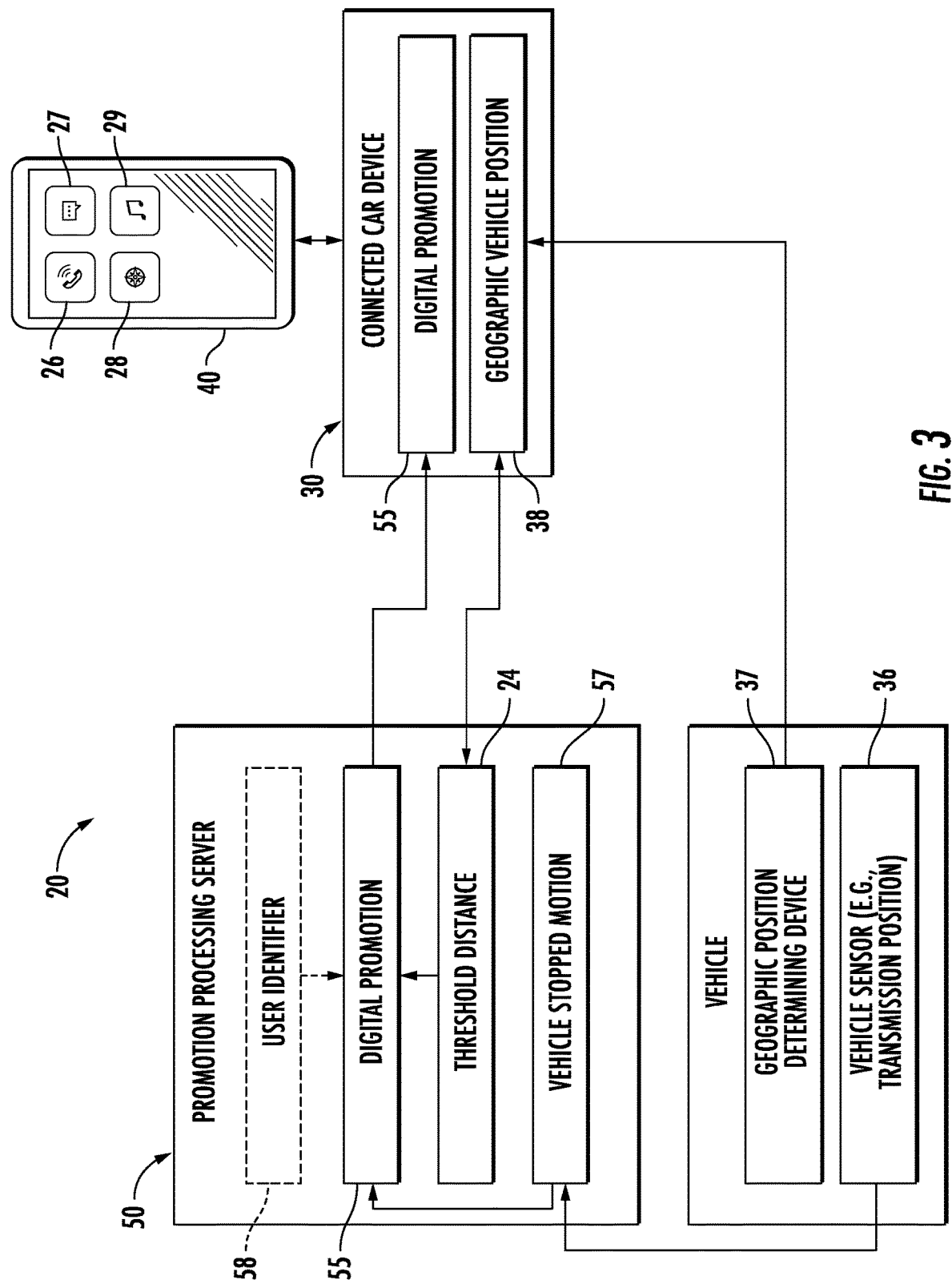
FIG. 3 is a schematic operational block diagram of the promotion processing system of FIG. 1.
Figure 4:
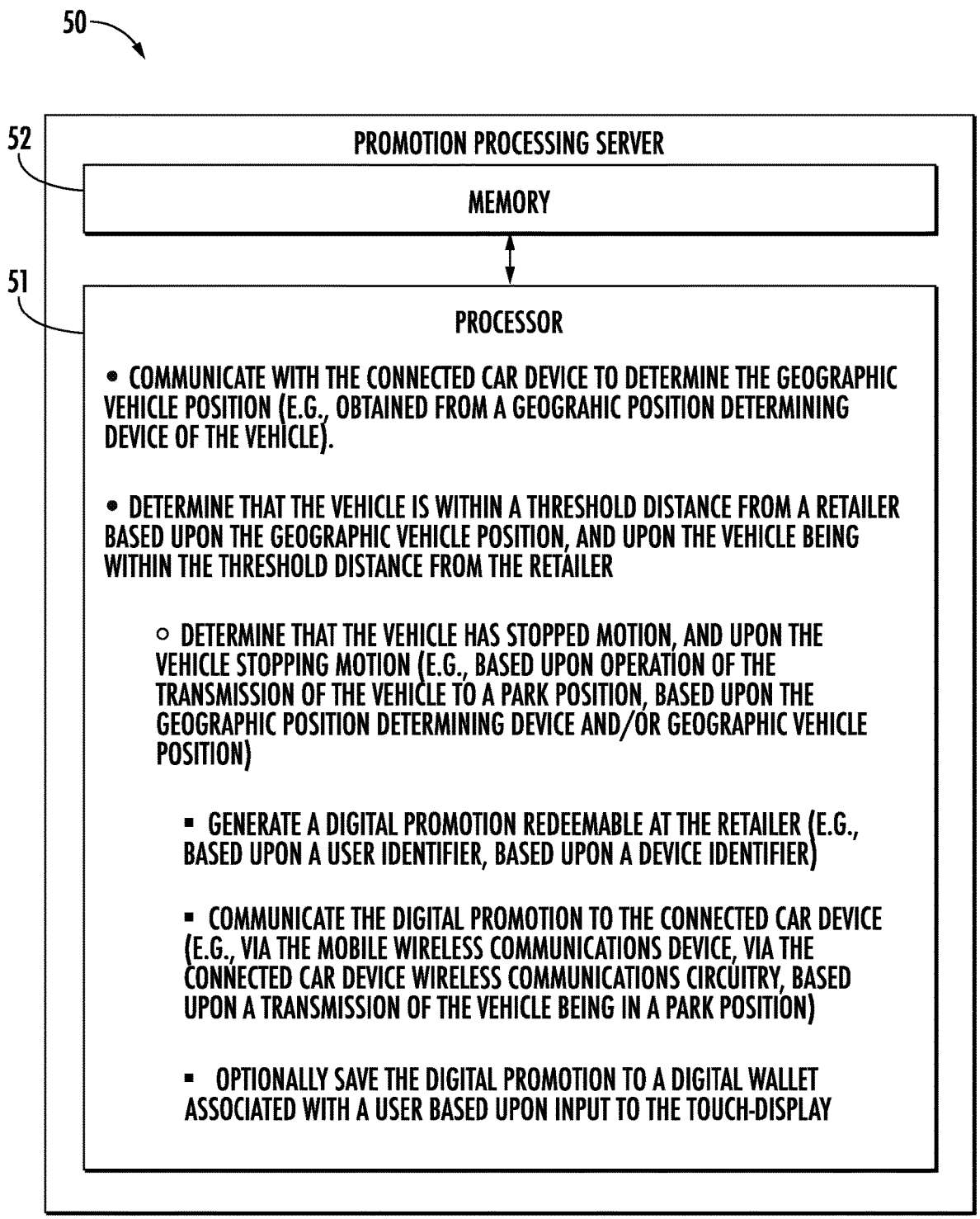
FIG. 4 is a schematic block diagram of the promotion processing server of FIG. 1.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Referring initially to FIGS. 1-4, a promotion processing system 20 for a vehicle 21 of a given make and model may include a connected car device 30. The connected-car device 30 is positioned in the vehicle 21 and may include a head unit 31, wireless communications circuitry 32 coupled to the head unit, and a display 33 also coupled to the head unit. The display 33 may be a touch display, for example. The wireless communications circuitry 32 may include short-range communications circuitry (e.g., Bluetooth) for pairing and communicating with a mobile wireless communications device, WiFi communications circuitry, and/or cellular communications circuitry.

The connected car device 30 obtains a geographic vehicle position 38. The geographic vehicle position 38 may be obtained by a geographic position determining device 37, for example, a global positioning system (GPS) receiver that may be coupled to a vehicle data bus 35 and may be represented in terms of geographic position data, such as, for example, digital geographic coordinates.

The connected car device 30 may also permit control of at least one application on a mobile wireless communications device 40 associated with a user, for example, via the wireless communications circuitry 32 of the connected car device (e.g., Bluetooth paired communication between the connected car device and the mobile wireless communications device). The geographic vehicle position 38 may also be obtained, alternatively or additionally, from the mobile wireless communications device 40.

As will be appreciated by those skilled in the art, the connected car device 30 permits the head unit 31 and the display 33 to be a controller for the mobile wireless communications device 40. More particularly, the connected car device 30 controls applications on the mobile wireless communications device 40, such as, for example, phone applications 26, messaging applications 27, map applications 28, food ordering applications, and music and audio-book applications 29. Of course, other and/or additional applications may be controlled.

A vehicle controller 34 may be coupled to the display 33, for example, via the vehicle data bus 35. The vehicle controller 34 may be coupled to various vehicle systems and/or vehicle sensors 36 having a corresponding status that may be monitored or determined. Exemplary vehicle sensors 36 or systems may include position of a vehicle transmission (e.g., park, drive, neutral), oil sensors, tire pressure sensors, fluid level sensors, tire tread sensors, motor on/off, etc. The exemplary vehicle sensors 36 may be coupled to the vehicle data bus 35. The connected car device 30 may also be coupled to the vehicle data bus 35. The vehicle controller 34 may cooperate with the various vehicle sensors 36 to sense various conditions associated with the respective vehicle sensors. The status of the vehicle sensors 36 may be displayed on the display 33.

The promotion processing system 20 also includes a promotion processing server 50. The promotion processing server 50 includes a processor 51 and an associated memory 52. While operations of the promotion server 50 are described herein, those skilled in the art will be appreciate that the processor 51 and the memory 52 cooperate to perform the operations.

Figure 5A:
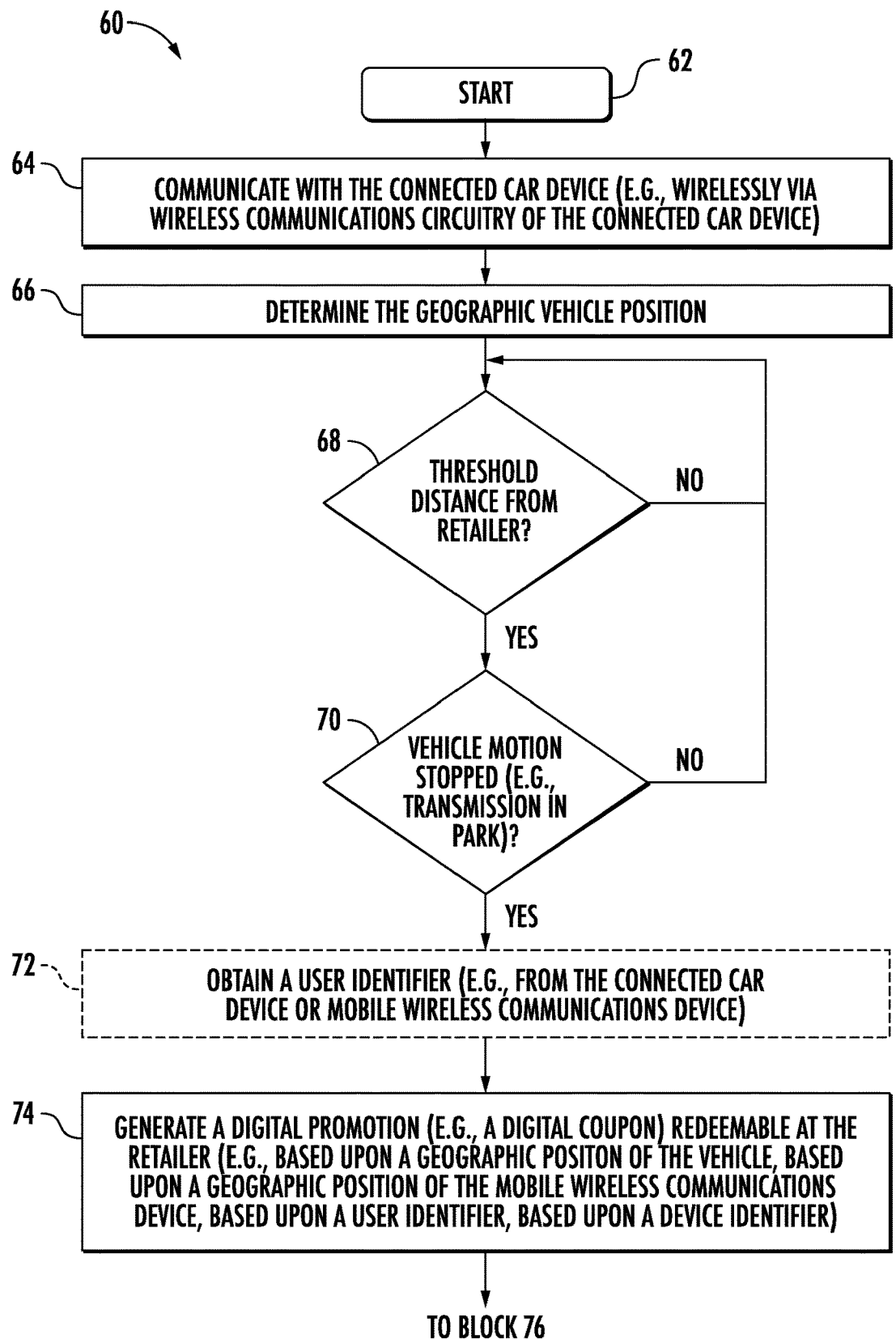
FIGS. 5A and 5B are flow diagrams of operation of the promotion processing server of FIG. 1.
Figure 5B:
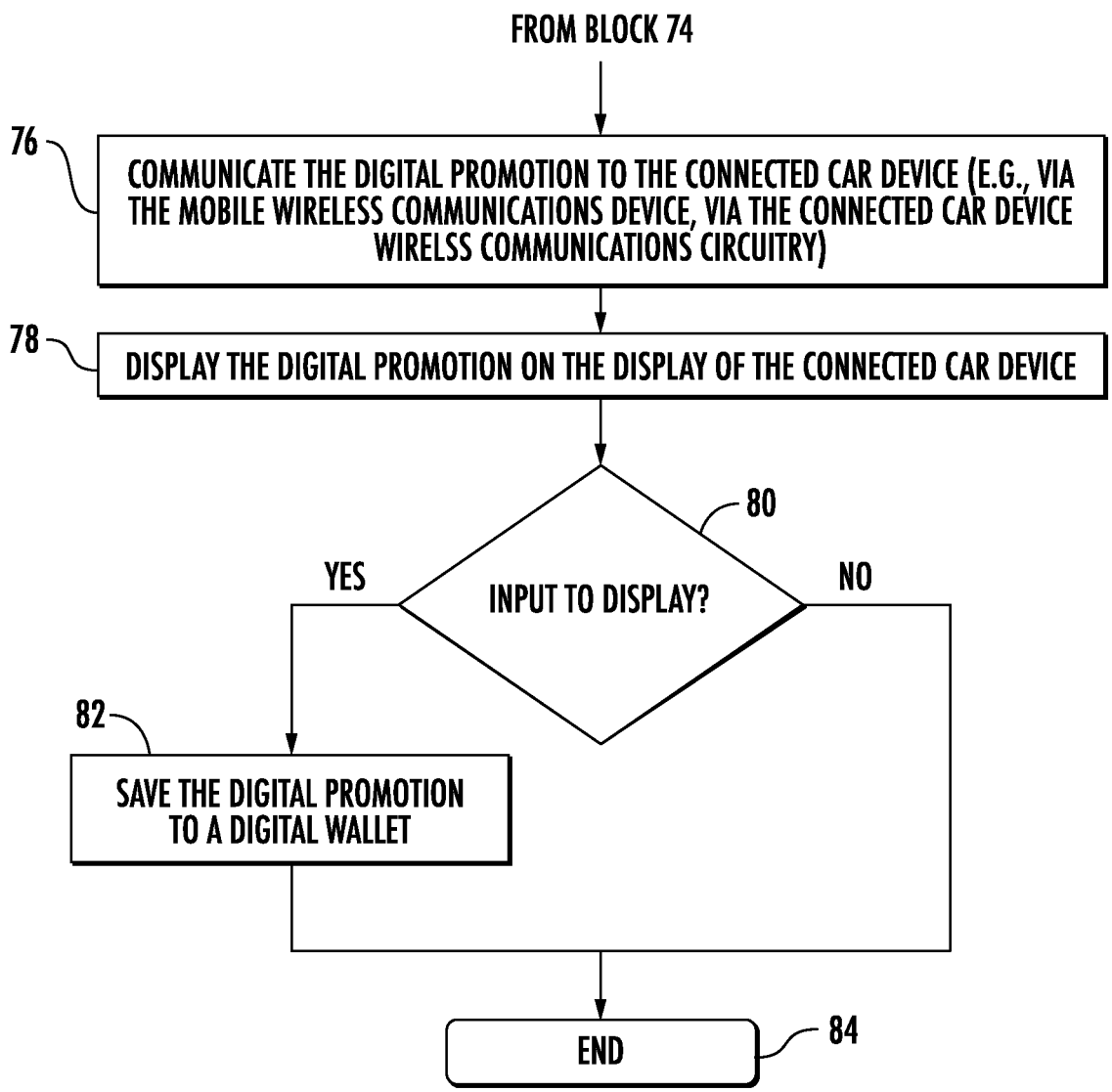

Referring now to the flowchart 60 in FIGS. 5A-5B, beginning at Block 62, operations of the promotion processing server 50 will now be described. The promotion processing server 50 communicates with the connected car device 30 to determine the geographic vehicle position 38. The promotion processing server 50 may communicate, for example, wirelessly, with the connected car device 30 via the wireless communications circuitry 32 including cellular or other long-range communications circuitry (Block 64), to determine the geographic vehicle position 38 (Block 66). The promotion processing server 50 may obtain raw digital coordinate data communicated from the GPS device 37, for example, wirelessly via the wireless communications circuitry 32, and process this data (e.g., by decoding the coordinates based upon a coordinate system to map to a geographic location, for example, in terms of street, business name, city, state, etc.) to determine the geographic vehicle position 38. The geographic vehicle position 38 may be displayed on a map (e.g., in the map application) on the display 33 of the connected car device 30.

In some embodiments, the promotion processing server 50 may obtain the geographic vehicle position also based upon a geographic position associated with the mobile wireless communications device 40. In other words, the when the mobile wireless communications device 40 is paired or otherwise wirelessly coupled to and in wireless communications with the connected car device 30, the geographic position of the mobile wireless communications device 40 (e.g., determined based upon a mobile device geographic position determining device or mobile device GPS receiver) may be used as an alternative or in addition to (e.g., representative of) the obtained geographic vehicle position 38 obtained by the connected car device. The mobile device geographic position may be communicated to the promotion processing server 50 via the connected car device 30 (e.g., using the connected car device as a communications relay).

At Block 68, the promotion processing server 50 determines that the vehicle 21 is within a threshold distance 24 from a retailer 23 (FIG. 1). In an exemplary implementation, the retailer 23 may be a grocery store, and the threshold distance 24 may be a distance that encompasses or includes a parking lot of the grocery store or adjacent associated parking area (e.g., within a same shopping center). The promotion processing server 50 may determine the vehicle 21 is within the threshold distance 24 by comparing the geographic vehicle position 38 to known geographic locations, and more particularly, the known geographic location of the retailer 23. The promotion processing server 50 may compare the coordinate data representative of the geographic vehicle position 38 to one or more coordinates representing the location of the retailer 23. The promotion processing server 50 may determine difference coordinates between the geographic vehicle position and the coordinates or coordinate set representing the retailer 23. If the difference is representative of a distance within the threshold distance, the promotion processing server 50 determines that the vehicle 21 is within the threshold distance from the retailer 23. Of course, other and/or additional techniques for determining the vehicle 21 to be within threshold distance 24 from the retailer 23 may be used.

When, at Block 68, the vehicle 21 is determined to be within the threshold distance 24 from the retailer 23, the promotion processing server 50 determines that the vehicle has stopped motion (Block 70). More particularly, the promotion processing server 50 may communicate, for example, wirelessly via the wireless communications circuitry 32, with the vehicle controller 34 to determine a position of the vehicle 21. The promotion processing server 50 may obtain the transmission position (e.g., on an ongoing basis during operation of the vehicle 21) such that when the position of the transmission is park (the status 56 of which may be indicated on the display 33), the promotion processing server determines that the vehicle has stopped (i.e., vehicle motion stopped 57) (Block 70). In an embodiment, the promotion processing server 50 may poll for the transmission position such that upon the position of the transmission changing between drive and park, the promotion processing server may determine that the vehicle motion has stopped. Other and/or additional techniques may be used by the promotion processing server to determine that the vehicle 21 has stopped.

Figure 6:
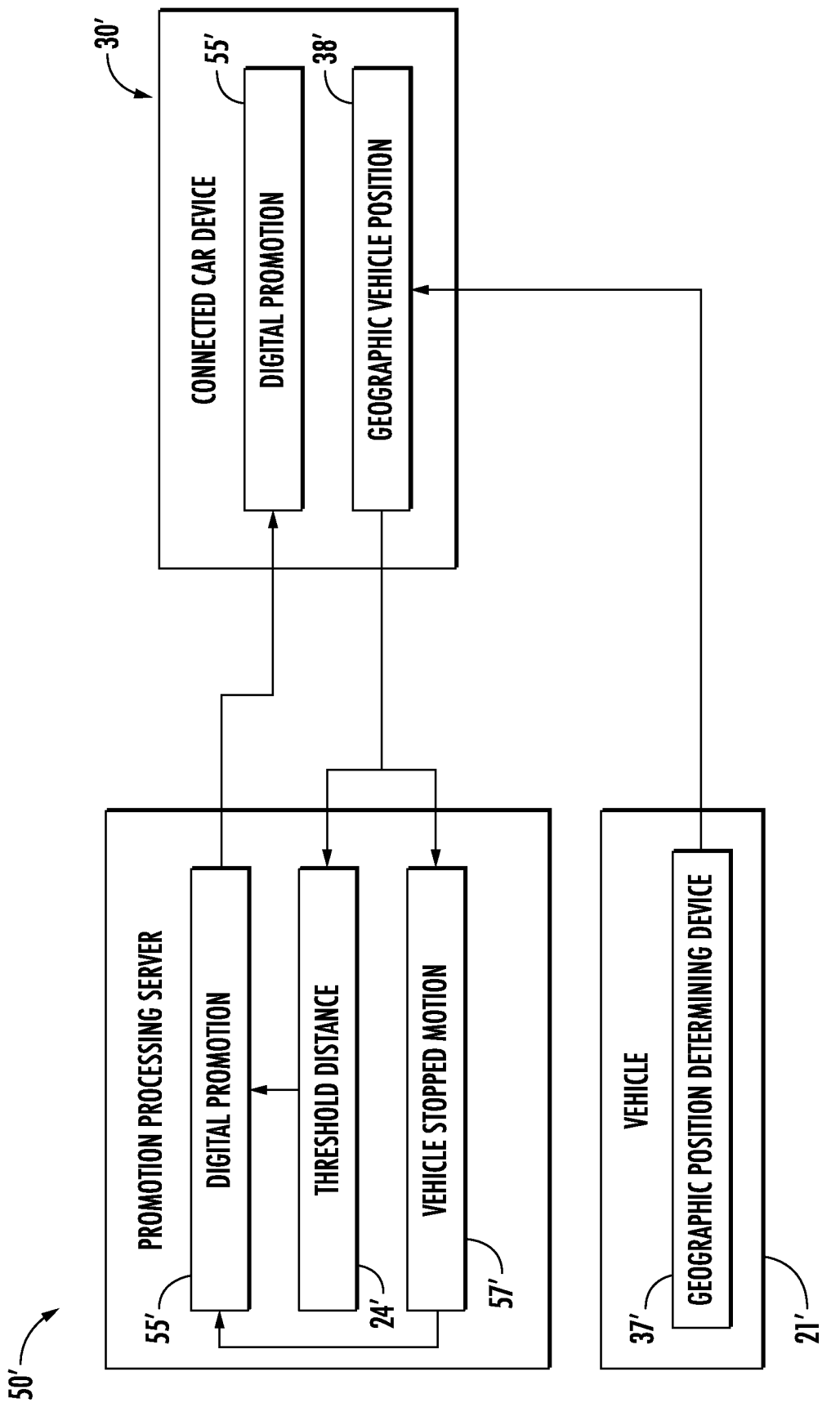
FIG. 6 is a schematic block diagram of a portion of a promotion processing system in accordance with another embodiment.

Referring briefly to FIG. 6, in another embodiment, the promotion processing server 50' may communicate with the geographic position determining device 37' within the vehicle 21', for example, on an ongoing basis, over time, and/or at desired intervals, to obtain the geographic vehicle position 38'. The promotion processing server 50' may determine that the vehicle has stopped motion 57' based upon there being no changes in the vehicle geographic position 38' for a threshold time (e.g., less than 10-seconds when an updated geographic position is being received every second or few seconds). A digital promotion 55' may be generated by the promotion processing server 50' based upon the threshold distance 24' and upon the vehicle stopping motion 57'. The use of the geographic position data 38' to determine that the vehicle has stopped motion may be in addition to other data, such as, for example, the transmission of the vehicle being in a park position, and/or another vehicle sensor, as will be appreciated by those skilled in the art.

The present embodiment may be used in conjunction with other methods or techniques for determining that the vehicle 21 has stopped motion. Obtained geographic positions of the mobile wireless communications device 40 may alternatively or additionally be used by the promotion processing server 50 (e.g., when communicating wirelessly with the connected car device 30) to determine that the vehicle 21 has stopped motion.

Referring again to FIGS. 1-5B, in some embodiments, the promotion processing server 50 may communicate, for example, wirelessly via the wireless communications circuitry 32, with the vehicle controller 34 to determine an on/off status of a vehicle motor (e.g., motor operational status), which may be used in to determine the vehicle 21 has stopped motion or used in conjunction with other techniques, for example, as described herein.

Upon the vehicle 21 being within the threshold distance 24 of the retailer 23 (Block 68) and upon the vehicle stopping motion (Block 70), the promotion processing server 50 generates a digital promotion 55 redeemable at the retailer (Block 74). The promotion processing server 50 may generate the digital promotion 55 to be in the form of a digital coupon redeemable toward a product or service associated with the retailer 23. For example, in the exemplary implementation of retailer 23 being in the form of a grocery store, the digital promotion 55 may be redeemable for a food product within the grocery store (e.g., $1.00 off Brand-B Biscuits) or for a redeemable value off a purchase (e.g., $5.00 off your order of $25.00 or more). While the digital promotion 55 is illustratively in the form of a digital coupon, in an embodiment, the digital promotion may be a digital rebate. Further details of generation of the digital promotion 55 will now be described.

The promotion processing server 50 may alternatively or additionally generate the digital promotion 55 based upon a unique user identifier 58 associated with the user. More particularly, the promotion processing server 50 may obtain the user identifier 58 (Block 72) from the connected car device 30, for example, via the wireless communications circuitry 32. The user identifier 58 may be an email address, user identifier associated with one or more of the applications on the mobile wireless communications device 40, a phone number, or other unique identifier. The promotion processing server 50 may, based upon the user identifier 58, obtain historical purchase data, for the user, such as, for example, dates and times of shopping trips, items purchased including corresponding unique item identifiers (e.g., UPC, SKU, PLU), item description, quantity purchased, price paid for each item, loyalty account data, and/or whether a promotion was used. Thus, at Block 74, the promotion processing server 50 may generate the digital promotion 55 to be targeted for the user, that is redeemable for a product that the promotion processing server may determine is needed (e.g., by purchase cadence), the user is likely or more likely to purchase (e.g., by operating predictive analytics or machine learning functions), and/or the user may need or be desirable of.

Figure 7:
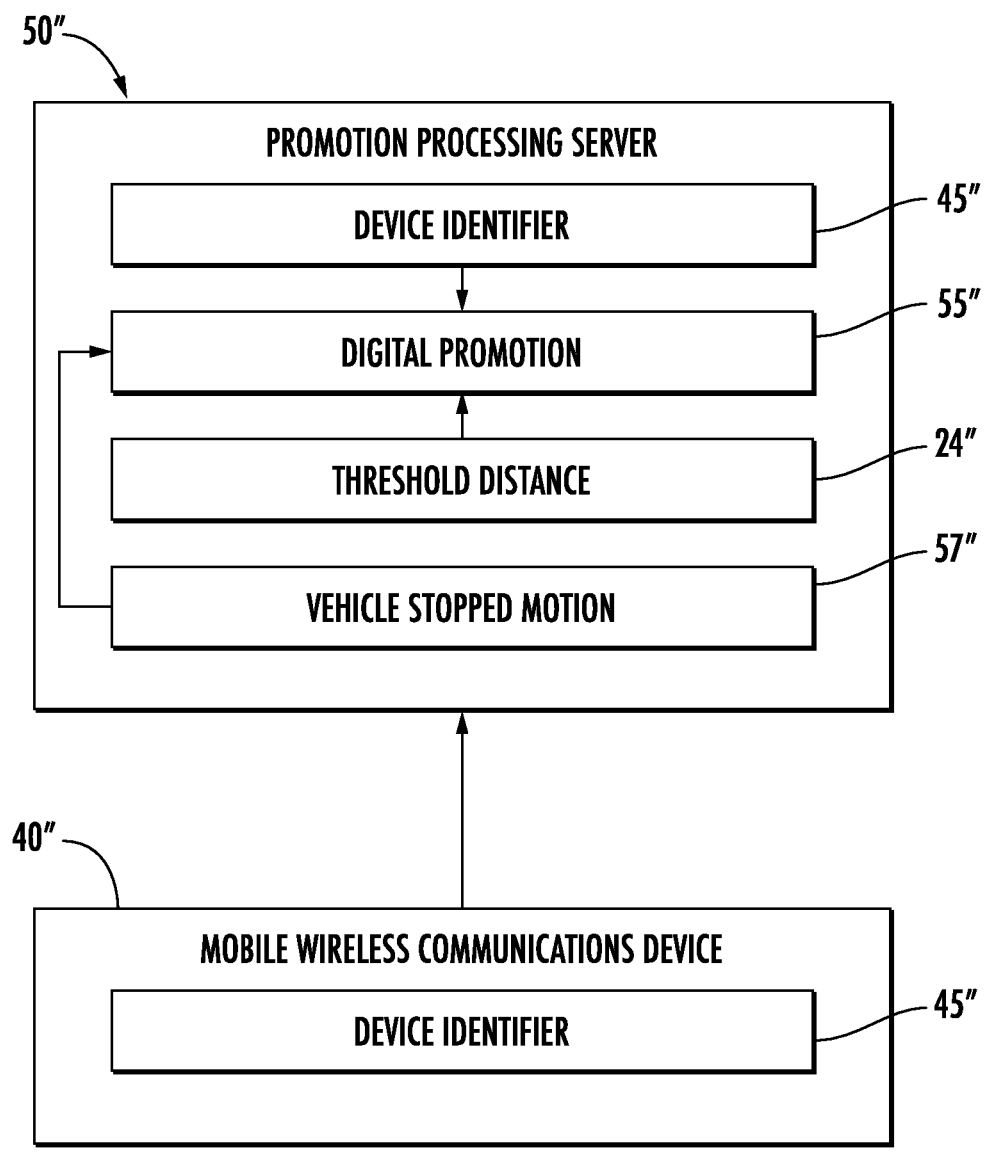
FIG. 7 is a schematic block diagram of a portion of a promotion processing system in accordance with another embodiment.

Referring briefly to FIG. 7, in another embodiment, the promotion processing server 50" may obtain a device identifier 45" associated with the mobile wireless communications device 40" (e.g., phone number, serial number, international mobile equipment identity (IMEI), etc.). The promotion processing server 50" may generate the digital promotion 55" based upon the device identifier 45", for example. Similarly to the user identifier, the device identifier 45" may be used to retrieve information about the user, such as, for example, dates and times of shopping trips, items purchased including corresponding unique item identifiers (e.g., UPC, SKU, PLU), item description, quantity purchased, price paid for each item, loyalty account data, whether a promotion was used, and/or current and historical connected car devices (e.g. historical vehicular WiFi networks and/or Bluetooth vehicle device interfaces previously and/or currently provisioned and connected). Generation of the digital promotion 55" is also based upon the vehicle being within the threshold distance 24" and the vehicle stopping motion 57", as described above.

Referring again to FIGS. 1-5B, the promotion processing server 50, at Block 76, communicates, for example, via the wireless communications circuitry 32, the digital promotion 55 to the connected car device 30 (e.g., directly to the connected car device without communicating the digital promotion via the mobile wireless communications device 40). The promotion processing server 50 may communicate the digital promotion 55 when the vehicle transmission being in the park position is used to determine whether the vehicle has stopped motion, for example. In other words, the digital promotion 55 may not be displayed on the display 33 until the vehicle 21 has been put into the park position (i.e., not moving).

In some embodiments, the promotion processing server 50 may communicate the digital promotion 55 to the connected car device 30 via the mobile wireless communications device 40. In other words, the promotion processing server 50 may wirelessly communicate the digital promotion 55 to the mobile wireless communications device 40 via mobile device wireless communications circuitry, which may, in turn, communicate, e.g., via Bluetooth or other short-range wireless communications protocol, the digital promotion to the connected car device 30 for display on the display 33.

The digital promotion 55 is displayed on the display 33 of the connected car device 30 (Block 78). The promotion processing server 50 may save the digital promotion 55 to a digital wallet 25 associated with the user. More particularly, the promotion processing server 50 may determine at Block 80 whether touch input has been provided to the display 33, for example, when the display is in the form of a touch display. Upon input by the user to the touch display 33, (Block 80), for example, touch input to the display corresponding to the display location of the digital promotion 55, the promotion processing server 50 may save the digital promotion to the digital wallet 25 for future redemption (Block 82). The digital wallet 25 may be identified for the given user based upon the obtained user identifier 24 and/or device identifier 45", as described above. Operations end at Block 84.

In some embodiments, a machine readable code, such as, for example, a QR code may be displayed on the display 33 either alongside or instead of the digital promotion 55. Capturing or scanning of the QR code by the mobile wireless communications device 40 may save the digital promotion 55 to the digital wallet 25. The product or service corresponding to the digital promotion 55 may be added to a list, such as, for example, a list of needed or desired items, in the exemplary embodiment, groceries.

A method aspect is directed to a method of processing a promotion. The method includes using a promotion processing server 50 to communicate with a connected car device 30 to determine a geographic vehicle position 38. The connected car device 30 may be configured to be positioned in a vehicle 21, obtain the geographic vehicle position 38, and permit control of at least one application on a mobile wireless communications device 40. The method also includes using the promotion processing server 50 to determine that the vehicle 21 is within a threshold distance 24 from a retailer 23 based upon the geographic vehicle position 38, and upon the vehicle being within the threshold distance from the retailer, determine that the vehicle has stopped motion 57. The method further includes using the promotion processing server 50 to, upon the vehicle stopping motion 57, generate a digital promotion 55 redeemable at the retailer 23, and communicate the digital promotion to the connected car device 30.

A computer readable medium aspect is directed to a non-transitory computer readable medium for processing a promotion, the non-transitory computer readable medium including computer executable instructions that when executed by a processor 51 cause the processor to perform operations. The operations include communicating with a connected car device 30 to determine a geographic vehicle position 38. The connected car device 30 may be configured to be positioned in a vehicle 21, obtain the geographic vehicle position 38, and permit control of at least one application on a mobile wireless communications device 40. The operations also include determining that the vehicle 21 is within a threshold distance 24 from a retailer 23 based upon the geographic vehicle position 38, and upon the vehicle being within the threshold distance from the retailer, determining that the vehicle has stopped motion 57, and upon the vehicle stopping motion, generating a digital promotion 55 redeemable at the retailer, and communicating the digital promotion to the connected car device 30.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A promotion processing system for a vehicle comprising:
    a connected car device carried by the vehicle and coupled to a data bus in the vehicle, the connected car device comprising a head unit, wireless communications circuitry coupled to the head unit, and a display coupled to the head unit, the connected car device configured to obtain a geographic vehicle position from a geographic positioning system (GPS) receiver coupled to the vehicle data bus, and permit the head unit and the display to cooperate as a mobile device controller to control at least one application on a mobile wireless communications device via the wireless communications circuitry;
    a vehicle controller coupled to the connected car device via the vehicle data bus and at least one vehicle sensor via the vehicle data bus, the vehicle controller configured to sense a vehicle stopped condition based upon the at least one vehicle sensor, and communicate the sensed vehicle stopped condition with the connected car device; and
    a promotion processing server configured to
        communicate with the connected car device, via the mobile wireless communications device, to determine the geographic vehicle position,
        communicate with the mobile wireless communications device to determine a further geographic vehicle position based upon a mobile device GPS receiver carried by the mobile wireless communications device, and determine that the vehicle is within a threshold distance from a retailer based upon the geographic vehicle position and the further geographic vehicle position, and upon the vehicle being within the threshold distance from the retailer, determine that the vehicle has stopped motion based upon no change in the geographic and further geographic vehicle positions for a threshold time period and based upon sensing the vehicle stopped condition, and upon the vehicle stopping motion, generate a digital promotion redeemable at the retailer, and communicate the digital promotion to the connected car device, via the mobile wireless communications device, for display on the display.

2. The promotion processing system of claim 1 wherein the promotion processing server is configured to sense the vehicle stopped condition upon operation of a transmission of the vehicle to a park position.

3. The promotion processing system of claim 1 wherein the promotion processing server is configured to communicate the digital promotion to the connected car device based upon a transmission of the vehicle being in a park position.

4. The promotion processing system of claim 1 wherein the promotion processing server is configured to communicate the digital promotion to the connected car device for display thereat via the mobile wireless communications device.

5. The promotion processing system of claim 1 wherein the mobile wireless communications device has a device identifier associated therewith; and wherein the promotions processing server is configured to obtain the device identifier from the mobile wireless communications device and generate the digital promotion based upon the device identifier.

6. The promotion processing system of claim 1 wherein a user has a user identifier associated therewith; and wherein the promotion processing server is configured to obtain the user identifier and generate the digital promotion based upon the user identifier.

7. The promotion processing system of claim 1 wherein the connected car device comprises a touch-display; and wherein the promotion processing server is configured to save the digital promotion to a digital wallet associated with a user based upon input to the touch-display.

8. A promotion processing server comprising:
a processor and an associated memory configured to
communicate with a connected car device, via a mobile wireless communications device, to determine a geographic vehicle position from a geographic positioning system (GPS) receiver coupled to a vehicle data bus of a vehicle, the connected car device carried by the vehicle and coupled to the vehicle data bus of the vehicle, the connected car device configured to obtain the geographic vehicle position, and permit a head unit and a display of the connected car device to cooperate as a mobile device controller to control at least one application on a mobile wireless communications device, the connected car device comprising wireless communications circuitry coupled to the head unit, communicate with the mobile wireless communications device to determine a further geographic vehicle position based upon a mobile device GPS receiver carried by the mobile wireless communications device, and determine that the vehicle is within a threshold distance from a retailer based upon the geographic vehicle position and the further geographic vehicle position, and upon the vehicle being within the threshold distance from the retailer, determine that the vehicle has stopped motion based upon no change in the geographic and further geographic positions for a threshold time period and based upon sensing a vehicle stopped condition, the vehicle stopped condition being sensed from at least one sensor coupled to a vehicle controller via the vehicle data bus, the vehicle controller coupled to the connected car device via the vehicle data bus and configured to communicate the sensed vehicle stopped condition with the connected car device, and upon the vehicle stopping motion, generate a digital promotion redeemable at the retailer, and communicate the digital promotion to the connected car device, via the mobile wireless communications device, for display on the display.

9. The promotion processing server of claim 8 wherein the processor is configured to sense the vehicle stopped condition based upon operation of a transmission of the vehicle to a park position.

10. The promotion processing server of claim 8 wherein the processor is configured to communicate the digital promotion to the connected car device based upon a transmission of the vehicle being in a park position.

11. A method of processing a promotion comprising:
using a promotion processing server to
communicate with a connected car device, via a mobile wireless communications device, to determine a geographic vehicle position from a geographic positioning system (GPS) receiver coupled to a vehicle data bus of a vehicle, the connected car device carried by the vehicle and coupled to the vehicle data bus of the vehicle, the connected car device configured to obtain the geographic vehicle position, and permit a head unit and a display of the connected car device to cooperate as a mobile device controller to control at least one application on a mobile wireless communications device, the connected car device comprising wireless communications circuitry coupled to the head unit, communicate with the mobile wireless communications device to determine a further geographic vehicle position based upon a mobile device GPS receiver carried by the mobile wireless communications device, and determine that the vehicle is within a threshold distance from a retailer based upon the geographic vehicle position and the further geographic vehicle position, and upon the vehicle being within the threshold distance from the retailer, determine that the vehicle has stopped motion based upon no change in the geographic and further geographic positions for a threshold time period and based upon sensing a vehicle stopped condition, the vehicle stopped condition being sensed from at least one sensor coupled to a vehicle controller via the vehicle data bus, the vehicle controller coupled to the connected car device via the vehicle data bus and configured to communicate the sensed vehicle stopped condition with the connected car device, and upon the vehicle stopping motion, generate a digital promotion redeemable at the retailer, and communicate the digital promotion to the connected car device, via the mobile wireless communications device, for display on the display.

12. The method of claim 11 wherein using the promotion processing server comprises using the promotion processing server to sense the vehicle stopped condition based upon operation of a transmission of the vehicle to a park position.

13. The method of claim 11 wherein using promotion processing server comprises using the promotion processing server to communicate the digital promotion to the connected car device based upon a transmission of the vehicle being in a park position.

14. A non-transitory computer readable medium for processing a promotion, the non-transitory computer readable medium comprising computer executable instructions that when executed by a processor cause the processor to perform operations comprising:

communicating with a connected car device, via a mobile wireless communications device, to determine a geographic vehicle position from a geographic positioning system (GPS) receiver coupled to a vehicle data bus of a vehicle, the connected car device carried by the vehicle and coupled to the vehicle data bus of the vehicle, the connected car device configured to obtain the geographic vehicle position, and permit a head unit and a display of the connected car device to cooperate as a mobile device controller to control at least one application on a mobile wireless communications device, the connected car device comprising wireless communications circuitry coupled to the head unit;

communicating with the mobile wireless communications device to determine a further geographic vehicle position based upon a mobile device GPS receiver carried by the mobile wireless communications device; and determining that the vehicle is within a threshold distance from a retailer based upon the geographic vehicle position and the further geographic vehicle position, and upon the vehicle being within the threshold distance from the retailer, determining that the vehicle has stopped motion, based upon no change in the geographic and further geographic positions for a threshold time period and based upon sensing a vehicle stopped condition, the vehicle stopped condition being sensed from at least one sensor coupled to a vehicle controller via the vehicle data bus, the vehicle controller coupled to the connected car device via the vehicle data bus and configured to communicate the sensed vehicle stopped condition with the connected car device, and upon the vehicle stopping motion, generating a digital promotion redeemable at the retailer, and communicating the digital promotion to the connected car device, via the mobile wireless communications device, for display on the display.

15. The non-transitory computer readable medium of claim 14 wherein the operations comprise sensing the vehicle stopped condition based upon operation of a transmission of the vehicle to a park position.

16. The non-transitory computer readable medium of claim 14 wherein the operations comprise communicating the digital promotion to the connected car device based upon a transmission of the vehicle being in a park position.

* * * * *